(12) United States Patent
Brunet et al.

(10) Patent No.: US 6,496,873 B1
(45) Date of Patent: Dec. 17, 2002

(54) REAL TIME DEVICE DRIVER INTERFACE APPARATUS AND METHOD THEREFOR

(75) Inventors: Peter Thomas Brunet, Round Rock, TX (US); Francis Destombes, Paris (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/316,760

(22) Filed: May 21, 1999

(51) Int. Cl.$^7$ ................................................ G06F 9/54
(52) U.S. Cl. ...................... 709/321; 713/502; 710/260; 711/167; 711/171
(58) Field of Search ................................ 709/321–327, 709/328; 710/260–269; 713/400, 401, 500, 501, 502, 503, 600, 601; 711/167, 171

(56) References Cited

U.S. PATENT DOCUMENTS

| | | | | |
|---|---|---|---|---|
| 5,111,409 A | * | 5/1992 | Gasper et al. | 707/500.01 |
| 5,396,497 A | * | 3/1995 | Veltman | 375/240.25 |
| 5,410,710 A | * | 4/1995 | Sarangdhar et al. | 710/266 |
| 5,495,615 A | * | 2/1996 | Nizar et al. | 710/260 |
| 5,555,420 A | * | 9/1996 | Sarangdhar et al. | 710/266 |
| 5,689,618 A | * | 11/1997 | Gasper et al. | 704/276 |
| 5,794,018 A | * | 8/1998 | Vrvilo | 713/400 |
| 5,940,610 A | * | 8/1999 | Baker et al. | 713/600 |
| 6,247,135 B1 | * | 6/2001 | Feague | 713/400 |
| 6,354,748 B1 | * | 3/2002 | Vrvilo | 709/204 |
| 6,378,006 B1 | * | 4/2002 | Murata | 709/321 |

OTHER PUBLICATIONS

CaraDona et al., "New Synchronization Services for OSF Mach: Synchronizers", Open Software Foundation Research Institute, pp. 1–19, Aug. 1994.*

* cited by examiner

Primary Examiner—St. John Courtenay III
(74) Attorney, Agent, or Firm—Barry S. Newberger; Winstead Sechrest & Minick P.C.; Jeffrey S. LaBaw

(57) ABSTRACT

A method and apparatus for interfacing a device driver in real time applications are provided. On input, the device driver is probed to determine a data sample block size supported by the device driver. The device driver delivers data samples to a buffer at each interrupt. The buffer is accessed to determine the presence of data in at least one buffer entry, or block. At each such access, a first counter is incremented to point to a next buffer entry to be accessed. One or more buffer entries are filled at each interrupt, with any data samples not sufficient to fill an entry held by the device driver until a subsequent interrupt. A second counter is incremented by the number of entries filled by the device driver. The size of each block in the buffer is incremented until the number of data samples held by the device driver between each interrupt corresponds to the size of the block, wherein each of the first and second counters increment by one, on each access to the buffer. On output, a display cursor is synchronized with an audio signal being played by storing, in a buffer, a frame number associated with each block of data samples sent to the device driver. A head pointer tracks each entry in the buffer as the frame number is stored. As each corresponding frame is played a tail pointer is incremented to point to the buffer entry containing the frame number of a next set of data samples to be played. If the position of the display cursor corresponds to a frame earlier than the position of the last frame output by the device driver, the position of the cursor is repeatedly updated until the cursor position coincides with the position of the last frame output by the device driver.

51 Claims, 7 Drawing Sheets

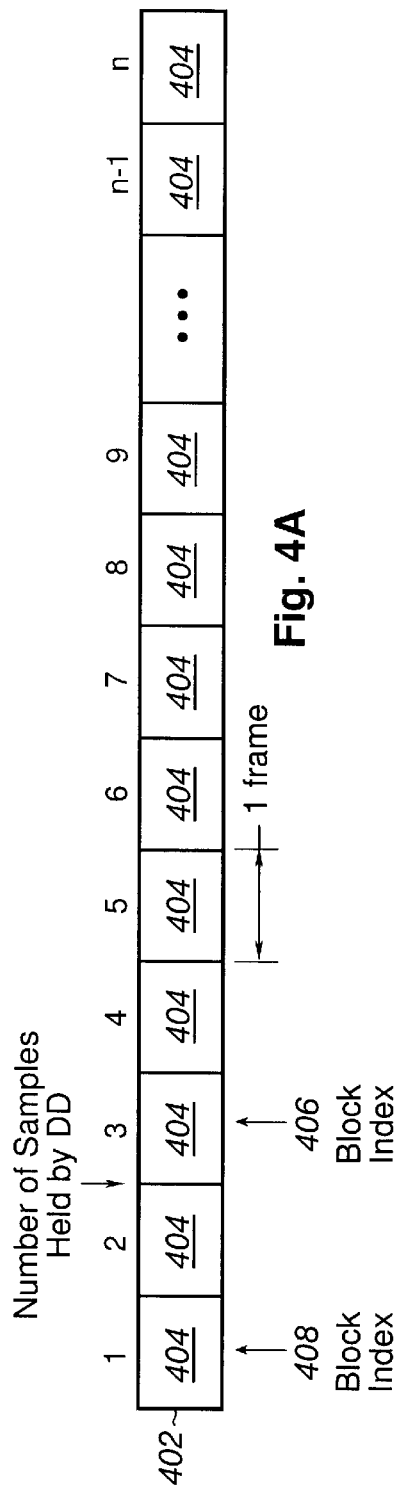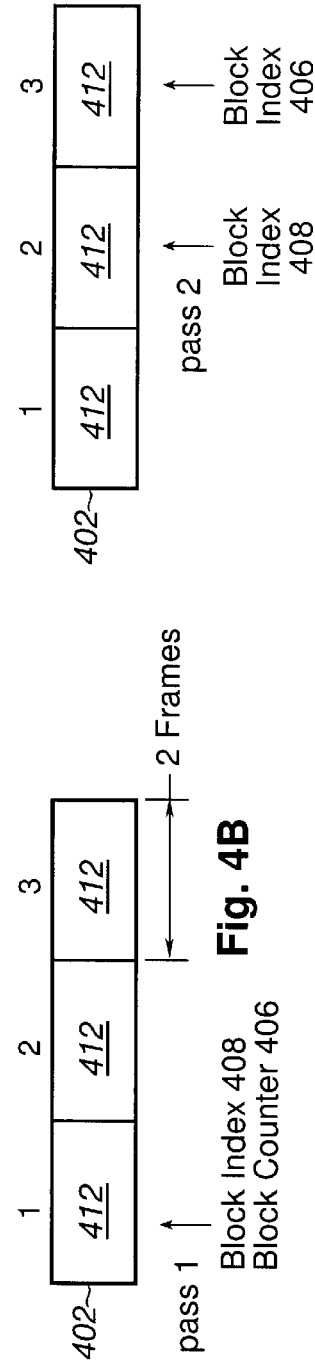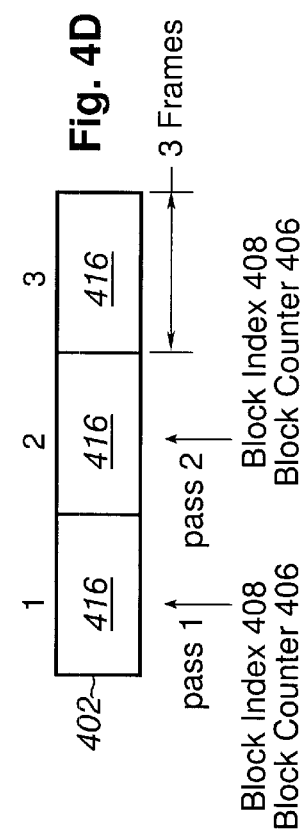

REAL TIME DEVICE DRIVER INTERFACE APPARATUS AND METHOD THEREFOR

TECHNICAL FIELD

The present invention relates in general to data processing systems, and in particular, to real time input/output interfacing in a data processing system.

BACKGROUND INFORMATION

Modern data processing systems commonly use signal processing hardware, and associated device drivers, supplied by third-party vendors. For example, audio processing systems in personal computers typically are obtained from one of several third-party vendors, for example, Creative Technology, Ltd. (SoundBlaster®), ESS Technologies, Inc., Crystal Semiconductor, and Yamaha. In data processing systems that provide real time responses to processed audio signals, the time constraints imposed by the real time responses may be incompatible with an audio processing device used in a particular data processing system. In such instances, the data processing application may fail due to an error from the audio application programming interface (API) call, or the graphical display may not fully represent actual real time conditions as audio is being input, i.e., there may be large intervals of time when critical audio data is missing with resulting gaps of data on the display device. In addition, when audio is being output there may be artifacts, such as portions of missing audio.

For example, a speech therapy application requires a real time visual response to audio I/O. Such speech therapy applications are used to train persons with hearing impairments, and require real time visual responses driven by changes in speech attributes articulated by the user. With respect to audio output, a visual graphic, which may be generically referred to as a cursor, must be coordinated, in real time, with an audio output signal. In speech therapy applications, a flying cursor is typically associated with the visual output, and tracks the audio being played back. For example, frequency components in the audio signal being played back may be displayed as a function of time, and a flying cursor used to visually track the corresponding portion of the spectrum with the audio being played. Thus, the data processing system must ensure that the cursor is synchronized with the audio signal being played. However, the interrupt rate supported by third-party audio system vendors may not be sufficient to output audio data when it is sent. As a consequence, the synchronism between a flying cursor and the audio output signal may be lost.

Thus, there is a need in the art for methods and apparatus to synchronize audio I/O systems with real time data processing applications.

SUMMARY OF THE INVENTION

The aforementioned needs are addressed by the present invention. Accordingly, there is provided, in a first form, a method for device driver interfacing. The method includes probing a device driver to determine a first data block size supported by a device driver interrupt rate. The method also synchronizes a graphical display to a sequence of output data signals, wherein the sequence of output data signals are operable for outputting as a sequence of second, predetermined, data block sizes.

There is also provided, in a second form, a data processing system that includes circuitry operable for probing a device driver to determine a first data block size supported by a device driver interrupt rate. The system also contains circuitry operable for synchronizing a graphical display to a sequence of output data signals, wherein the sequence of output data signals are operable for outputting as a sequence of second, predetermined, data block sizes.

Additionally, there is provided, in a third form, a computer program product operable for storing in a machine readable storage medium, the program product operable for device driver interfacing. The program product includes programming for probing a device driver to determine a first data block size supported by a device driver interrupt rate. Also provided in the computer program product, there is included programming for synchronizing a graphical display to a sequence of output data signals, wherein the sequence of output data signals are operable for outputting as a sequence of second, predetermined, data block sizes.

There is also provided, in a first form, an alternative embodiment of a method for device driver interfacing. The method includes probing a device driver to determine a first data block size supported by a device driver interrupt rate. Device driver probing step accesses a buffer having a plurality of entries, each entry being operable for storing a number of data samples and wherein the number of samples corresponds to a, selectable, size of each entry. The probing step also constitutes receiving a first plurality of data samples from the device driver, wherein the first plurality of data samples completely fills one or more of the plurality of entries, incrementing a first counter by a value corresponding to a number of the one or more of the plurality of entries filled in the receiving step, and incrementing a second counter by one in response to the accessing of the buffer.

There is also provided, in a second form, an alternative embodiment of a data processing system that includes circuitry operable for probing a device driver to determine a first data block size supported by a device driver interrupt rate. The probing circuitry contains circuitry operable accessing a buffer having a plurality of entries, each entry being operable for storing a number of data samples and wherein the number of samples corresponds to a, selectable, size of each entry, and circuitry operable for receiving a first plurality of data samples from the device driver, wherein the first plurality of data samples completely fills one or more of the plurality of entries. The probing circuitry also includes circuitry operable for incrementing a first counter by a value corresponding to a number of the one or more of the plurality of entries filled in the receiving step, and circuitry operable for incrementing a second counter by one in response to the accessing of the buffer.

Additionally, there is provided, in a third form, an alternative embodiment of a computer program product operable for storing in a machine readable storage medium, the program product operable for device driver interfacing. The program product includes programming for probing a device driver to determine a first data block size supported by a device driver interrupt rate. Also provided in the computer program product, is programming for accessing a buffer having a plurality of entries, each entry being operable for storing a number of data samples and wherein the number of samples corresponds to a, selectable, size of each entry, programming for receiving a first plurality of data samples from the device driver, wherein the first plurality of data samples completely fills one or more of the plurality of entries, and programming for incrementing a first counter by a value corresponding to a number of the one or more of the plurality of entries filled in the receiving step. The programming further contains programming for incrementing a second counter by one in response to the accessing of the buffer.

Additionally, there is also provided, in a first form, another alternative embodiment of a method for device driver interfacing. The method constitutes synchronizing a graphical user interface (GUI) to output data signals, wherein the output data signals are operable for outputting as a sequence of second, predetermined, data block sizes. The synchronization step includes incrementing a first counter in response to sending a first set of output data signals to the device driver, wherein the first counter points to a first entry in a buffer, each entry containing a data value corresponding to a data signal set number, and wherein the first entry contains a data set number corresponding to the first set, and incrementing a second counter in response to the device driver outputting a device output signal corresponding to a second set of data signals, the second counter pointing to a second entry, the second entry containing a data signal set number corresponding the second set.

There is also provided, in a second form, another alternative embodiment of a data processing system. The data processing system includes circuitry operable for synchronizing a graphical user interface (GUI) to output data signals, wherein the output data signals are operable for outputting as a sequence of second, predetermined, data block sizes. the synchronizing circuitry includes circuitry operable for incrementing a first counter in response to sending a first set of output data signals to the device driver, wherein the first counter points to a first entry in a buffer, each entry containing a data value corresponding to a data signal set number, and wherein the first entry contains a data set number corresponding to the first set, and circuitry operable for incrementing a second counter in response to the device driver outputting a device output signal corresponding to a second set of data signals, the second counter pointing to a second entry, the second entry containing a data signal set number corresponding the second set.

Additionally, there is provided, in a third form, another alternative embodiment of a computer program product operable for storing in a machine readable storage medium, the program product operable for device driver interfacing, in which the program product contains programming for synchronizing a graphical user interface (GUI) to output data signals, wherein the output data signals are operable for outputting as a sequence of second, predetermined, data block sizes. The synchronization programming includes programming for incrementing a first counter in response to sending a first set of output data signals to the device driver, wherein the first counter points to a first entry in a buffer, each entry containing a data value corresponding to a data signal set number, and wherein the first entry contains a data set number corresponding to the first set. Also included is programming for incrementing a second counter in response to the device driver outputting a device output signal corresponding to a second set of data signals, the second counter pointing to a second entry, the second entry containing a data signal set number corresponding the second set.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIGS. 4A–4D illustrate, schematically, a signal buffer in accordance with an embodiment of the present invention;

DETAILED DESCRIPTION

Figure 1:
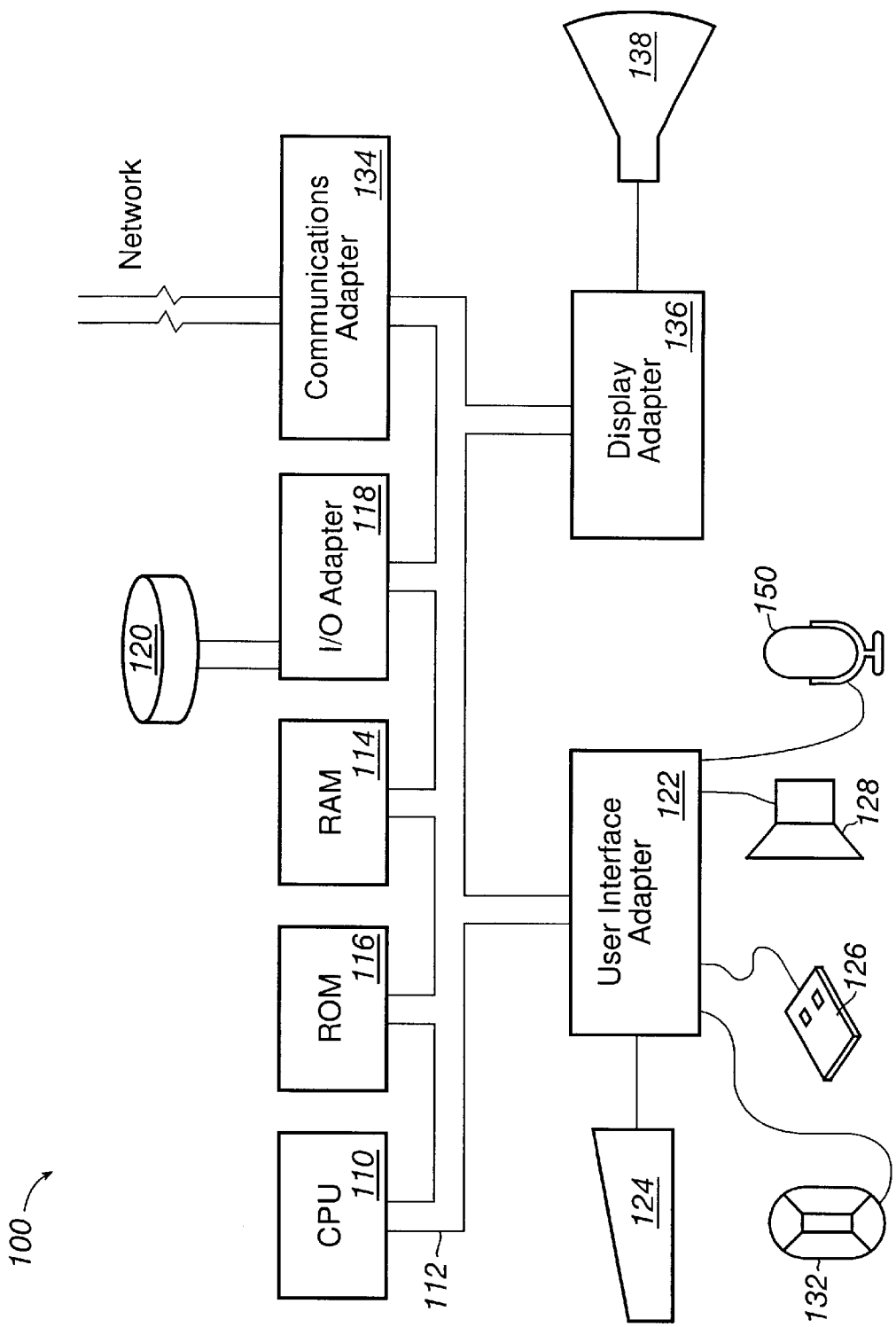
FIG. 1 illustrates, in block diagram form, a data processing system in accordance with one embodiment of the present invention.

The present invention provides a mechanism for real time feedback for audio input/output (I/O). On input, varying device driver interrupt rates are accommodated by probing the device driver to determine the interrupt rate that it can support. The sizes of digital audio data blocks are increased until the device driver responds with one block per device driver interrupt. Audio data may then be extracted by the data processing system application to correspond to a predetermined number of samples, called a frame, required by the data processing application. On output, successive frames are sent by the application to the device driver. As frames are sent, a corresponding frame number is loaded into a buffer. The device driver interrupts at its own rate and outputs the frames in sequence. As the device driver outputs frames, the device driver increments a pointer into the buffer. Using this pointer, the last frame output may be determined by reading the frame number from the buffer at the location of the pointer. A graphical display, such as a flying cursor, can be synchronized with the output audio by moving the display to a position on a graphical user interface (GUI), corresponding to the last frame sent.

In the following description, numerous specific details, such as frame and block sizes, are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Referring first to FIG. 1, an example is shown of a data processing system 100 which may be used for the invention. The system has a central processing unit (CPU) 110, which is coupled to various other components by system bus 112. Read only memory ("ROM") 116 is coupled to the system bus 112 and includes a basic input/output system ("BIOS") that controls certain basic functions of the data processing system 100. Random access memory ("RAM") 114, I/O adapter 118, and communications adapter 134 are also coupled to the system bus 112. I/O adapter 118 may be a small computer system interface ("SCSI[|P]') adapter that communicates with a disk storage device 120. Communications adapter 134 interconnects bus 112 with an outside network enabling the data processing system to communicate with other such systems. Input/Output devices are also connected to system bus 112 via user interface adapter 122 and display adapter 136. Keyboard 124, track ball 132, mouse 126, microphone 150, and speaker 128 are all interconnected to bus 112 via user interface adapter 122. Display monitor 138 is connected to system bus 112 by display adapter 136. In this manner, a user is capable of inputting to the system throughout the keyboard 124, trackball 132, mouse 126, or microphone 150 and receiving output from the system via speaker 128 and display 138. Additionally, an operating system is used to coordinate the functions of the various components shown in FIG. 1.

Preferred implementations of the invention include implementations as a computer system programmed to execute the method or methods described herein, and as a computer program product. According to the computer system implementation, sets of instructions for executing the method or methods are resident in the random access memory 114 of one or more computer systems configured generally as described above. Until required by the computer system, the set of instructions may be stored as a computer program product in another computer memory, for example, in disk drive 120 (which may include a removable memory such as an optical disk or floppy disk for eventual use in the disk drive 120). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical, biological, or some other physical change. While it is convenient to describe the invention in terms of instructions, symbols, characters, or the like, the reader should remember that all of these and similar terms should be associated with the appropriate physical elements.

Note that the invention may describe terms such as comparing, validating, selecting, identifying, or other terms that could be associated with a human operator. However, for at least a number of the operations described herein which form part of at least one of the embodiments, no action by a human operator is desirable. The operations described are, in large part, machine operations processing electrical signals to generate other electrical signals.

Figure 2:
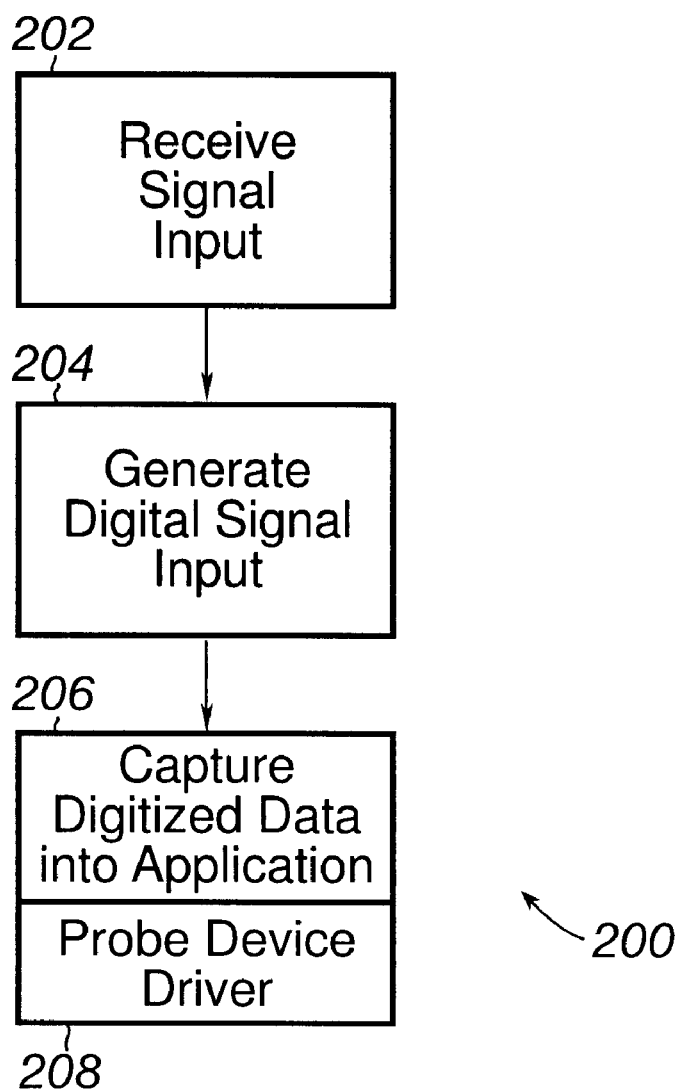
FIG. 2 illustrates, in flow chart form, an audio input methodology in accordance with an embodiment of the present invention.

Refer now to FIG. 2 illustrating an audio input methodology 200 in accordance with an embodiment of the present invention. Although methodology 200 is described in an audio context, it would be understood that the principles of the present invention may be used in any application in which there exists a mismatch between the capabilities of a device driver and real-time requirements of a GUI. Exemplary environments may include real-time video, or process control via sensors monitoring engineering data. It would be understood by an artisan of ordinary skill that to the extent that output data and input data are independent, input methodology 200 and synchronization methodology 500, discussed below in conjunction with FIG. 5, may be independent processes.

In step 202, audio signals are received by data processing system 100, FIG. 1. Audio input signals may be provided via microphone 150 in FIG. 1. In step 204, a digital audio signal corresponding to the signal input in step 202 is generated. A digital signal may be generated by circuitry incorporated in user interface adapter 122, in FIG. 1, which circuitry may be provided by a third-party vendor to the manufacturer of data processing system 100. Such audio systems may include systems produced by Creative Technology, Ltd. (SoundBlaster®), ESS Technologies, Inc., Crystal Semiconductor, and Yamaha. Associated with the circuitry is a software device driver also provided by the third-party vendor.

In step 206, the digitized data is captured into the application. The application captures the data in sets having a predetermined number of samples, referred to as a frame. Each sample itself constitutes a predetermined number of data bits. For example, in an embodiment of the present invention, a frame may include 256 samples, each sample of which includes sixteen bits. It would be understood, however, by an artisan of ordinary skill that alternative embodiments of methodology 200 in accordance with the present invention may have samples having other, predetermined numbers of bits, and a frame may be defined by other, predetermined numbers of samples. It would be further understood that such embodiments would be within the spirit and scope of the present invention.

In capturing digitized data, in step 206, methodology 200 probes the device driver for the audio system in step 208. The device driver is probed in step 208 to determine the interrupt rate of the device driver corresponding to the audio system used to generate the digital audio signal in step 204.

Figure 3:
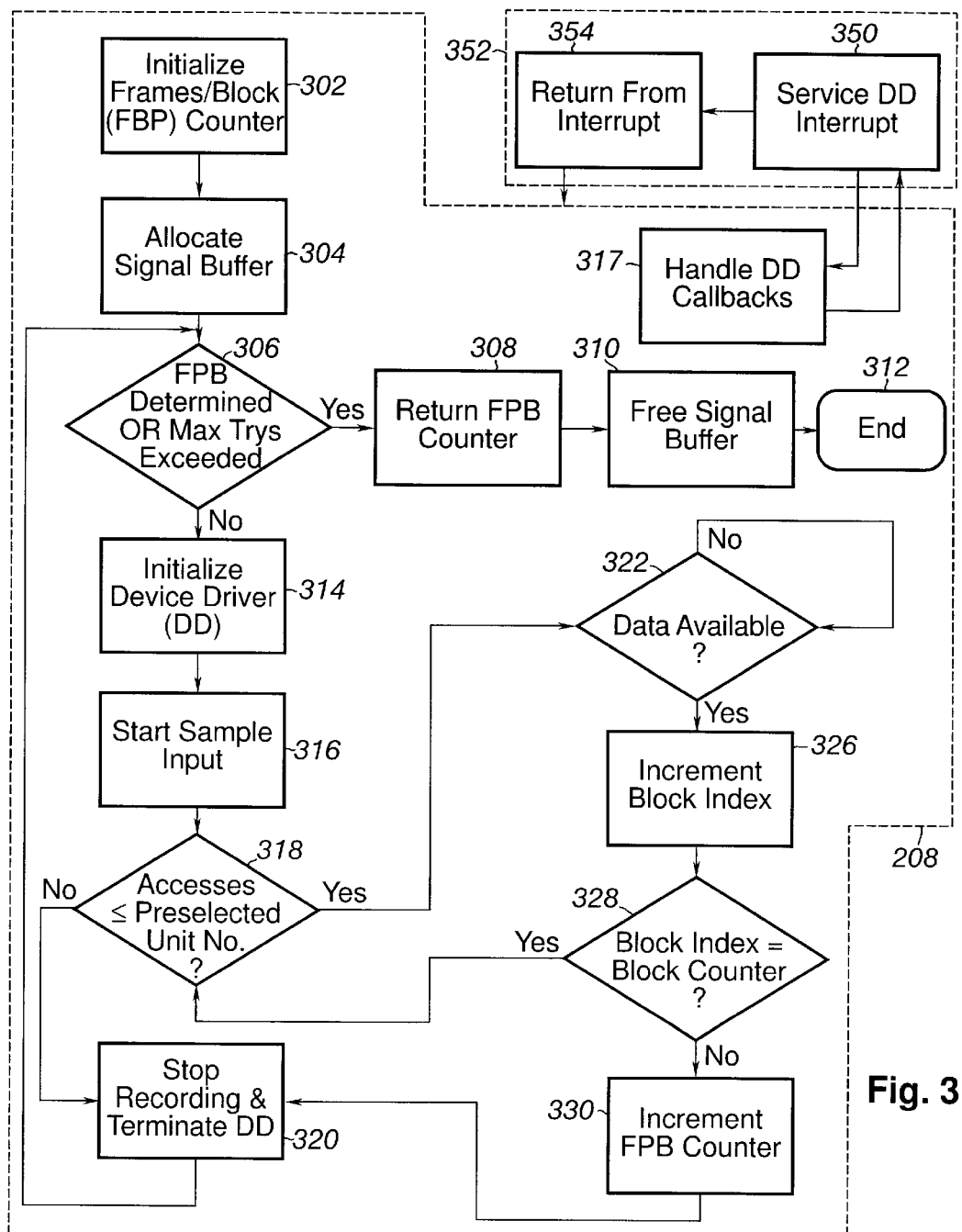
FIG. 3 illustrates, in flow chart form, a portion of an audio input methodology in accordance with an embodiment of the present invention.

Refer now to FIG. 3 illustrating in greater detail, probe methodology 208 in accordance with the present invention. In step 302, a frames-per-block (FPB) counter is initialized. A block represents a set of data samples delivered by the device driver to the application. A block may contain a number of samples corresponding to one or more frames, depending on the interrupt rate of the device driver. Executing probe methodology 208 determines a block size wherein the device driver delivers one block per interrupt. In step 302, the FPB counter may be initialized to one frame per block.

A buffer is allocated by the application and is maintained in the interface layer of the device driver. Data is input by the device driver into the buffer as it is processed by the audio system, and retrieved by the application from the buffer. The device driver holds the processed signal data until an interrupt interval has elapsed. The device driver then issues an interrupt and loads one block of data into the signal buffer. The interrupt interval of the device driver is inversely proportional to the interrupt rate of the driver, which is determined by the third-party vendor of the audio processor, and which, and discussed above, may not be known, a priori to the user of data processing system 100 executing the methods of the present invention. The signal buffer is allocated in step 304.

In step 306, methodology 208 determines if either a block size (determined as a number of frames per block) sufficient to hold all the signal data accumulated in one interrupt interval has been found, or if a maximum number of attempts has been exceeded. If either condition pertains, methodology 208 proceeds by the "Yes" branch, returns the value in the FPB counter, as the requisite block size, in step 308, and in step 310 frees the signal buffer. Methodology 208 then terminates in step 312.

If, however, the required block size has not been determined, or the maximum number of attempts not exceeded, methodology 208 initializes the device driver in step 314. In initializing the device driver, the current block size, measured in frames-per-block is passed to the device driver. Thus, initially, the buffer includes entries or blocks which hold a number of frames corresponding to the initial value of the FPB counter, in step 302. In other words, the initial block size corresponding to the initial number of frames-per-block is set in step 302. FIG. 4A illustrates a buffer 402 including a plurality of blocks 404. A block number appears above each block 404. Each block in buffer 402 is allocated to contain a number of samples corresponding to the initial value of the FPB counter.

Returning to FIG. 3, in step 316, sample input processing is initiated. On each interrupt issued by the device driver, the device driver loads data into buffer 402. Interrupts are serviced by methodologies implemented by the operating system and device driver, shown as step 350, in operating system (OS) portion 352, in FIG. 3. In step 350, the device driver loads data into 402, and invokes a callback routine within methodology 208, in step 317. After the interrupt is serviced, operating system portion 352 then returns from the interrupt to methodology 208, in step 354. The device driver loads a number of samples sufficient to fill one or more blocks 404, and continues to hold any remaining samples that are insufficient to completely fill a block 404. As the device driver loads data into buffer 402, the device driver, through the callback routine, invoked in step 317, increments a block counter 406. Block counter 406 indicates the block number of the last block in buffer 402 loaded by the device driver.

Probe methodology 208 begins capturing blocks from the device driver by accessing buffer 402. The buffer is accessed a predetermined maximum number of times in order to ensure that on each access, the device driver is keeping up, that is, the device driver is filling only a single block in the signal buffer at each interrupt.

In step 318, methodology 208 determines if a current number of accesses exceeds the preselected maximum number of accesses. If in step 318 the number of accesses exceeds the preselected number, in step 320 recording is stopped and the device driver is terminated. Because the number of accesses exceeded the preselected number, step 306 will return to step 308 and the frames-per-block value will be equal to the maximum value, that is, the preselected number of steps. This ensures that the loop eventually terminates in the case that the device driver cannot support a reasonable number of frames-per-block. Probe methodology 308 then returns to step 306.

If, however, in step 318 the current number of accesses is smaller than or equal to the preselected maximum number of accesses, probe methodology 208 loops in 322, wherein buffer 402 is polled for data. If data is not available in buffer 402, step 322 continues the polling loop via the "No" branch.

At each interrupt generated by the device driver, the value of the block counter is determined by an audio sample rate, the size of each of blocks 404, and the rate at which the device driver issues interrupts. For example, in an audio system having a sample rate of 22,050 samples-per-second, and a block size of 256 samples, corresponding to a size of block 404 of one frame per block, a block is generated every 11.6 milliseconds (ms). If, however, the device driver issues interrupts every 34.8 ms, at each interrupt, the device driver holds 768 samples, three blocks (if the device driver was initialized with a block size of one frame per block) and, in such an embodiment, the device driver fills buffer 402, and block counter 406 is incremented by three, as illustrated in FIG. 4A (The initial value, in FIG. 4A is zero.).

On return to step 322, data is available and step 322 proceed by the "Yes" branch. It would be understood by an artisan of ordinary skill that, if data is available on entering the polling loop, in step 322, methodology 208 would likewise follow the "Yes" branch.

In step 326, a block index, such as block index 406 in FIG. 4A, is incremented. The block index points to the next block available for access. In step 328 it is determined if the block index is equal to the block counter. If so, methodology 208 returns to step 318 to do a next access to the signal buffer, such as buffer 402, if the preselected number of accesses have not been performed. Probe methodology 208 then loops through steps 318–328 to perform a next access.

If, however, in step 328 the block index and the block counter are not equal, the FPB counter is incremented in step 330. Recording is stopped and the device driver terminated in step 320, and probe methodology 208 returns to step 306. Because, in step 328, the block index and block counters were unequal, the device driver interrupt rate is insufficient to provide one block per access for the current block size. Thus, on returning to step 306, the required FPB value has not been determined. Probe methodology 208 then continues with steps 314–330. In step 314, the device driver is initialized with the new value of the FPB counter, set in step 330.

The new value of the FPB counter is passed to the driver, and signal buffer 402 is allocated with blocks 412 having a width of two frames, FIG. 4B. The buffer is allocated by the application which provides a pointer to the buffer to the device driver.

Now using a block of two frames, suppose, as in the previously described example, the interrupt rate of the device driver is one-third the frame sample rate. When the device driver interrupts, it holds three frames, or one and one-half blocks of audio samples. The device driver then sends two frames, or one block, to buffer 402 and holds the remaining one-half block of samples. In the exemplary embodiment described above, the device driver thus sends 512 samples and holds 256 samples. The block counter is incremented by one through one call to the device driver callback routine, step 313

Methodology 208 accesses buffer 402 in steps 318–328, as previously described. Methodology 208 polls buffer 402 in step 322, and if no data is available, loops until data becomes available. When data is available in buffer 402, the block index, such as block index counter 408 in FIG. 4B is incremented in step 326. FIG. 4B illustrates the state of block counter 406 and block index 408 after a single access to buffer 402, and a single device driver interrupt. Thus, in step 328, block counter 406 and block index 408 are equal, and probe methodology 208 proceeds, by the "Yes" branch to a next access of buffer 402 by returning to step 318, and hence by the "Yes" branch of step 318 to step 322.

At the next interrupt, step 350, the device driver holds the one frame, or one-half block retained following the previous interrupt, and an additional three frames, or one and one-half blocks. Thus, the device driver holds a total of two blocks, which the device driver loads to buffer 402. The device driver also makes two successive calls to the device driver callback routine, step 317, and the block counter, such as block counter 406 in FIG. 4B is thereby incremented twice. On return from the interrupt, step 354, when data is available in buffer 402, the polling loop, step 322, exits. In step 326, the block index is incremented, wherein the state of block counter 406 and block index 408, are as illustrated in FIG. 4C. Thus, in step 328, the value of the block counter and block index are unequal, and the FPB counter is incremented, in step 330. Recording is stopped and the device driver terminated in step 320. Methodology 208 then returns to step 306, and because the number of frames per block in which the device driver delivers a single block on each interrupt has not yet been determined, probe methodology 208 proceeds through steps 314–330 again.

In step 314, the device driver is initialized, and each block in signal buffer 402 is allocated with a block size corresponding to three frames. Now however, on each pass through the access loop, steps 318, 322–328, when the device driver interrupts, a block of three frames is sent to signal buffer 402. Each block 416 in signal buffer 402 is three frames wide, FIG. 4D. Hence, on each interrupt, on handling the callbacks, in step 324, block counter 406 is incremented by one. Likewise, on each access, in step 326, block index 408 is incremented by one. Therefore, as illustrated in FIG. 4D, block index 408 and block counter 406 maintain the same value on each access to signal buffer 402, and step 328 follows the "Yes" branch on each access. After the preselected number of accesses to signal buffer 402 have been made, probe methodology 208 exits the loop formed by steps 318, 322–328 by the "No" branch in step 318. Recording is stopped and the device driver terminated in step 320, and methodology 208 again returns to step 306. However, in step 306, now the block size corresponding to the interrupt rate of the device driver has been determined and methodology 208 then returns, in step 308, the FPB counter corresponding to the block size. The signal buffer is freed in step 310 and probe methodology 208 terminates in step 312.

In this way, the data processing application determines the block size supported by the device drivers, and the application can interface to the device drivers without generating an error from the audio API call, or causing errors in the visual display. Data samples may be delivered to the graphical user interface (GUI) components of the application in frame size sets of samples (that is, "deblocked") and stored for subsequent playback. This methodology allows an application to use a variety of device drivers, each of which may have different interrupt rate capabilities. As a result, the application GUI may be updated without incurring excessive latency between the audio input and an update of the display.

Methodology 208 has been described hereinabove in accordance with an embodiment in which the interrupt rate of the device driver is three times the frame sample rate. However, an artisan of ordinary skill would understand that a description in terms of such an exemplary embodiment serves to illustrate the principles of the present invention and that the present invention does not depend on such a specific embodiment. An artisan of ordinary skill would further understand that embodiments having other interrupt rates would be within the spirit and scope of the present invention.

Figure 5:
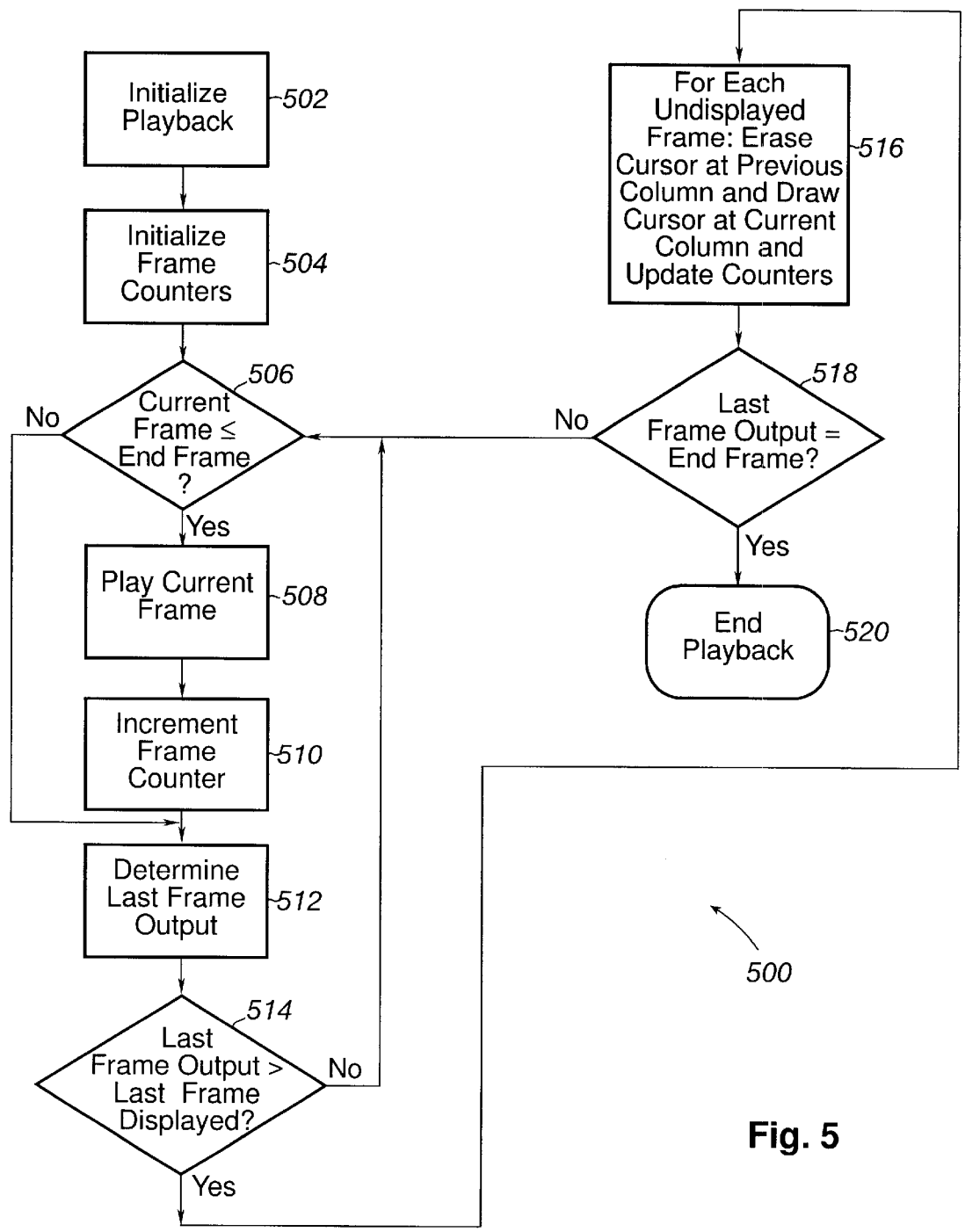
FIG. 5 illustrates, in flow chart form, an audio output methodology in accordance with an embodiment of the present invention.

Refer now to FIG. 5 illustrating cursor synchronization methodology 500 in accordance with the present invention. In step 502, playback of a plurality of frames of audio data is initialized. In step 504, a frame counter is initialized to a number of a preselected start frame. Additionally, a number of a last frame displayed corresponds to the number of the start frame, less one. In step 506, methodology 500 determines if the current frame, as represented by the frame counter, is less than or equal to a preselected end frame number. If so, in step 508, the current frame is played. Playing of the current frame, includes, inter alia, sending the audio samples contained within the frame to the device driver. This will be described further in conjunction with the FIG. 7, below. In step 510, the frame counter is incremented in preparation for playing the next frame. However, due to buffering in the device driver, there is a latency between "playing" the frame and the subsequent hearing thereof.

In step 512, the last frame output by the audio playback device is determined. Frames sent to the device driver, and the frames played back by the device driver are tracked using a buffer which may, in an embodiment of the present invention, be a circular buffer.

Figure 6:
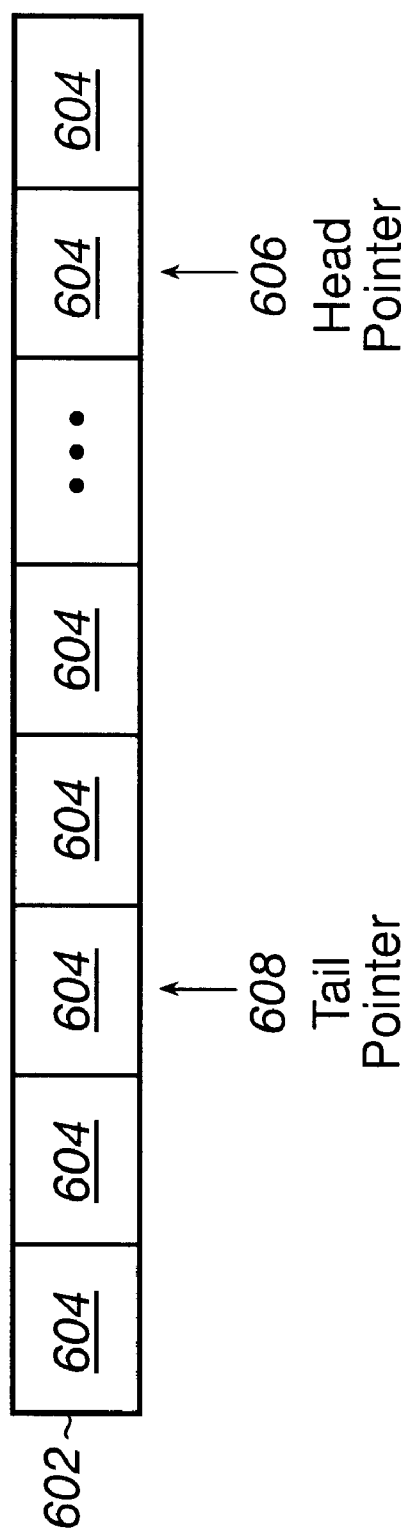
FIG. 6 illustrates, schematically, an output buffer in accordance with an embodiment of the present invention.

Referring now to FIG. 6, there is schematically illustrated buffer 602 including a plurality of entries 604. Each entry may store a number of an audio frame for outputting. Head pointer 606 points to an entry 604 containing the number of the last frame sent to the device driver by methodology 500. The operation of head pointer 606 will be described further hereinbelow, in conjunction with FIG. 7. Tail pointer 608 points to an entry 604 containing the number of the last frame played back by the device driver. Tail pointer 608 will also be further described in conjunction with FIG. 7. Buffer 602 may be circular buffer wherein on reaching a last entry 604 in buffer 602, the next data value is stored in a first entry 604, and head pointer 606 and tail pointer 608 wrap back to the first entry 604 after reaching the last entry 604. The last frame output is determined in step 512 by referring to the frame number contained in the entry 604 pointed to by tail pointer 608.

In step 514, it is determined if the number of the last frame output, from step 512, exceeds the number of the last frame displayed, as set in step 504. If not, the cursor and audio are in sync, and methodology 500 returns to step 506. Otherwise, if in step 514 the number of the last frame output exceeds the last frame displayed, then in step 516, the cursor and the audio are synchronized by erasing the cursor at a previous column position and drawing the cursor at the column position corresponding to the current column, and updating the last frame displayed counter to the number of the last frame output, as determined in step 512. In an embodiment of the present invention, column positions are determined by a temporal display window on the GUI. The temporal window corresponds to a preselected temporal length of data to be displayed. The temporal length of each column of the GUI may span one or more frames. If the temporal length spans a single frame, then each column represents one frame. Otherwise, the frames spanned by the window are interpolated and displayed in the window. Synchronization methodology 500 then determines if the last frame output, from step 512 is equal to the preselected end frame number, in step 518. If not, methodology 500 loops by returning to step 506 to play the next frame, corresponding to the current number in the frame counter, from step 510. If, however, in step 518, the last frame output corresponds to the preselected end frame, then the playback ends in step 520.

Figure 7:
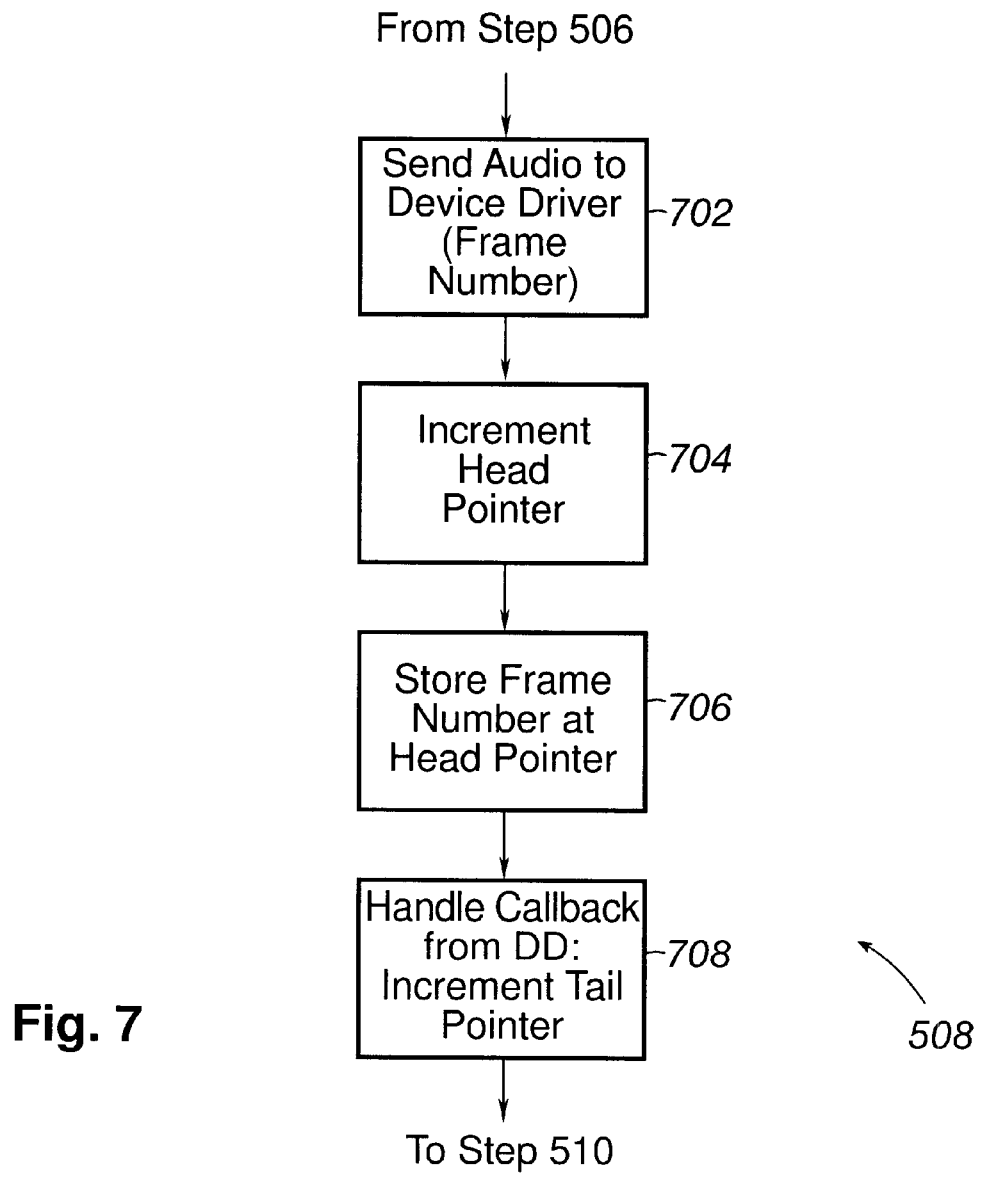
FIG. 7 illustrates, in flow chart form, a portion of an audio output methodology in accordance with the present invention.

Refer now to FIG. 7 illustrating the methodology for playing the current frame, step 508. In step 702, the audio corresponding to the current frame is sent to the device driver. The audio is sent by passing the frame number of the current frame to the device driver. (The frame number is used to generate a pointer into a buffer holding each frame of audio data.) In step 704, head pointer 606, FIG. 6, is incremented, and in step 706, the current frame number is stored in entry 604 pointed to by head pointer 606. In step 708, a callback from the device driver following output of the audio signal by the device driver corresponding to the frame number in entry 604 pointed to by tail pointer 608 is handled, and tail pointer 608 is incremented to the next entry 604 in buffer 602.

In this way, cursor synchronization methodology 500 synchronizes a graphical display with the audio signal being output. A reference to each block of audio data to be played is buffered. References to new blocks to be output are buffered at the head of the buffer, and the device driver outputs the audio signal corresponding to the reference at the tail of the buffer. The visual indicators are made to track the frames being output from the tail of the buffer, thereby synchronism is maintained between the graphical display and the sound that is output by the audio system.

Although the present invention and its advantages have been described in detail, it should be understood that various changes, substitutions and alterations can be made herein without departing from the spirit and scope of the invention as defined by the appended claims.

What is claimed is:

1. A method for device driver interfacing comprising the steps of:

probing a device driver to determine a first data block size supported by a device driver interrupt rate wherein a set of input data signals from said device driver has said first data block size; and synchronizing a graphical display to output data signals, wherein said output data signals are operable for outputting as a sequence of second, predetermined, data block sizes, said output data signals being generated in response to a plurality of said input data signals.

2. The method of claim 1 wherein said probing step comprises:

accessing a buffer having a plurality of entries, each entry operable for storing a number of data samples and wherein said number of samples corresponds to a, selectable, size of each entry;

receiving a first plurality of data samples from said device driver, wherein said first plurality of data samples completely fills one or more of said plurality of entries;

incrementing a first counter by a value corresponding to a number of said one or more of said plurality of entries filled in said receiving step; and incrementing a second counter by one in response to said accessing of said buffer.

3. The method of claim 2 wherein said accessing step is executed in response to a presence of data in said buffer.

4. The method of claim 2 wherein said probing step further comprises the steps of:

increasing said entry size by a predetermined number of samples when a value of said first counter and a value of said second counter are unequal; and repeating said steps of accessing, receiving, and incrementing said first and second counters.

5. The method of claim 4 wherein said probing step further comprises the step of incrementing a third counter when said value of said first counter and said value of said second counter are unequal, and wherein said entry size, after incrementing, corresponds to a value of said third counter, when said entry size is measured in said predetermined number of samples.

6. The method of claim 2 wherein said probing step further comprises the step of:

repeating said steps of accessing and incrementing said first and second counters for a preselected number of accesses; and outputting a current value of said entry size when respective values of said first and second counters are equal after each access, said first data block size corresponding to said current value of said entry size.

7. The method of claim 2 wherein said probing step further comprises the steps of:

repeating said steps of accessing and incrementing said first and second counters for a preselected number of accesses; and terminating said repeating step when respective values of said first and second counters are unequal.

8. The method of claim 1 wherein said synchronizing step further comprises the steps of:

incrementing a first counter in response to sending a first set of output data signals to said device driver, wherein said first counter points to a first entry in a buffer, each entry containing a data value corresponding to a data signal set number, and wherein said first entry contains a data set number corresponding to said first set; and incrementing a second counter in response to said device driver outputting a device output signal corresponding to a second set of data signals, said second counter pointing to a second entry, said second entry containing a data signal set number corresponding said second set.

9. The method of claim 8 wherein said buffer comprises a circular buffer.

10. The method of claim 8 wherein said synchronizing step further comprises the step of modifying a graphical display when a value of said first counter and said second counter are unequal.

11. The method of claim 10 wherein said step of modifying said graphical display comprises the steps of:

erasing said graphical display at a current position on a display device, said current position corresponding to a last data signal set displayed;

drawing said graphical display at a succeeding position on said display device, said succeeding position corresponding to a next data signal set; and repeating said erasing and drawing steps until said succeeding position corresponds to said second data signal set.

12. A data processing system comprising:

circuitry operable for probing a device driver to determine a first data block size supported by a device driver interrupt rate wherein a set of input data signals from said device driver has said first data block size; and circuitry operable for synchronizing a graphical display to output data signals, wherein said output data signals are operable for outputting as a sequence of second, predetermined, data block sizes, said output data signals being generated in response to a plurality of said input data signals.

13. The data processing system of claim 12 wherein said circuitry operable for probing comprises:

circuitry operable for accessing a buffer having a plurality of entries, each entry operable for storing a number of data samples and wherein said number of samples corresponds to a, selectable, size of entry;

circuitry operable for receiving a first plurality of data samples from said device driver, wherein said first plurality of data samples completely fills one or more of said plurality of entries;

circuitry operable for incrementing a first counter by a value corresponding to a number of said one or more of said plurality of entries filled in said receiving step; and circuitry operable for incrementing a second counter by one in response to said accessing of said buffer.

14. The data processing system of claim 13 wherein said circuitry operable for accessing comprises circuitry operable in response to a presence of data in said buffer.

15. The data processing system of claim 13 wherein said circuitry operable for probing further comprises:
   circuitry operable for increasing said entry size by a predetermined number of samples when a value of said first counter and a value of said second counter are unequal; and
   circuitry operable for repeating said accessing, receiving, and incrementing said first and second counters.

16. The data processing system of claim 15 wherein said circuitry operable for probing further comprises circuitry operable for incrementing a third counter when said value of said first counter and said value of said second counter are unequal, and wherein said entry size, after incrementing, corresponds to a value of said third counter, when said entry size is measured in said predetermined number of samples.

17. The data processing system of claim 13 wherein said circuitry operable for probing further comprises:
   circuitry operable for repeating accessing and incrementing said first and second counters for a preselected number of accesses; and
   circuitry operable for outputting a current value of said entry size when respective values of said first and second counters are equal after each access, said first data block size corresponding to said current value of said entry size.

18. The data processing system of claim 13 wherein said circuitry operable for probing further comprises:
   circuitry operable for repeating said accessing and incrementing said first and second counters for a preselected number of accesses; and
   circuitry operable for terminating said repeating step when respective values of said first and second counters are unequal.

19. The data processing system of claim 12 wherein said circuitry operable for synchronizing further comprises:
   circuitry operable for incrementing a first counter in response to sending a first set of output data signals to said device driver, wherein said first counter points to a first entry in a buffer, each entry containing a data value corresponding to a data signal set number, and wherein said first entry containing a data set number corresponding to said first set; and
   circuitry operable for incrementing a second counter in response to said device driver outputting a device output signal corresponding to a second set of data signals, said second counter pointing to a second entry, said second entry containing a data signal set number corresponding said second set.

20. The data processing system of claim 19 wherein said buffer comprises a circular buffer.

21. The data processing system of claim 19 wherein said circuitry operable for synchronizing further comprises circuitry operable for modifying a graphical display when a value of said first counter and said second counter are unequal.

22. The data processing system of claim 21 wherein said circuitry operable for modifying said graphical display comprises:
   circuitry operable for erasing said graphical display at a current position on a display device, said current position corresponding to a last data signal set displayed;
   circuitry operable for drawing said graphical display at a succeeding position on said display device, said succeeding position corresponding to a next data signal set; and
   circuitry operable for repeating said erasing and drawing steps until said succeeding position corresponds to said second data signal set.

23. A computer program product operable for storing in a machine readable storage medium, said program product operable for device driver interfacing, the program product comprising:
   programming for probing a device driver to determine a first data block size supported by a device driver interrupt rate wherein a set of input data signals from said device driver has said first data block size; and
   programming for synchronizing a graphical display to output data signals, wherein said output data signals are operable for outputting as a sequence of second, predetermined, data block sizes, said output data being generated in response to a plurality of said input data signals.

24. The program product of claim 23 wherein said circuitry operable for probing comprises:
   programming for accessing a buffer having a plurality of entries, each entry operable for storing a number of data samples and wherein said number of samples corresponds to a, selectable, size of each entry;
   programming for receiving a first plurality of data samples from said device driver, wherein said first plurality of data samples completely fills one or more of said plurality of entries;
   programming for incrementing a first counter by a value corresponding to a number of said one or more of said plurality of entries filled in said receiving step; and
   programming for incrementing a second counter by one in response to said accessing of said buffer.

25. The program product of claim 24 wherein said programming for accessing comprises programming for accessing in response to a presence of data in said buffer.

26. The program product of claim 24 wherein said programming for probing further comprises:
   programming for increasing said entry size by a predetermined number of samples when a value of said first counter and a value of said second counter are unequal; and
   programming for repeating said accessing, receiving, and incrementing said first and second counters.

27. The program product of claim 26 wherein said programming for probing further comprises programming for incrementing a third counter when said value of said first counter and said value of said second counter are unequal, and wherein said entry size, after incrementing, corresponds to a value of said third counter, when said entry size is measured in said predetermined number of samples.

28. The program product of claim 24 wherein said programming for probing further comprises:
   programming for repeating accessing and incrementing said first and second counters for a preselected number of accesses; and
   programming for outputting a current value of said entry size when respective values of said first and second counters are equal after each access, said first data block size corresponding to said current value of said entry size.

29. The program product of claim 24 wherein said programming for probing further comprises:
   programming for repeating said accessing and incrementing said first and second counters for a preselected number of accesses; and
   programming for terminating said repeating step when respective values of said first and second counters are unequal.

30. The program product of claim 23 wherein said programming for synchronizing further comprises:

programming for incrementing a first counter in response to sending a first set of output data signals to said device driver, wherein said first counter points to a first entry in a buffer, each entry containing a data value corresponding to a data signal set number, and wherein said first entry containing a data set number corresponding to said first set; and programming for incrementing a second counter in response to said device driver outputting a device output signal corresponding to a second set of data signals, said second counter pointing to a second entry, said second entry containing a data signal set number corresponding said second set.

31. The program product of claim 30 wherein said buffer comprises a circular buffer.

32. The program product of claim 30 wherein said circuitry operable for synchronizing further comprises circuitry operable for modifying a graphical display when a value of said first counter and said second counter are unequal.

33. The program product of claim 32 wherein said programming for modifying said graphical display comprises:

programming for erasing said graphical display at a current position on a display device, said current position corresponding to a last data signal set displayed;

programming for drawing said graphical display at a succeeding position on said display device, said succeeding position corresponding to a next data signal set; and programming for repeating said erasing and drawing steps until said succeeding position corresponds to said second data signal set.

34. A method for device driver interfacing comprising the steps of:

probing a device driver to determine a first data block size supported by a device driver interrupt rate wherein a set of input data signals from said device driver has said first data block size, said probing step comprising the steps of:

accessing a buffer having a plurality of entries, each entry being operable for storing a number of data samples and wherein said number of samples corresponds to a, selectable, size of each entry;

receiving a first plurality of data samples from said device driver, wherein said first plurality of data samples completely fills one or more of said plurality of entries;

incrementing a first counter by a value corresponding to a number of said one or more of said plurality of entries filled in said receiving step; and incrementing a second counter by one in response to said accessing of said buffer.

35. The method of claim 34 wherein said probing step further comprises the steps of:

increasing said entry size by a predetermined number of samples when a value of said first counter and a value of said second counter are unequal;

repeating said steps of accessing, receiving, and incrementing said first and second counters, wherein said repeating step is performed for a preselected number of accesses; and outputting a current value of said entry size when respective values of said first and second counters are equal after each access, said first data block size corresponding to said current value of said entry size.

36. The method of claim 35 wherein said probing step further comprises the step of incrementing a third counter when said value of said first counter and said value of said second counter are unequal, and wherein said entry size, after incrementing, corresponds to a value of said third counter, when said entry size is measured in said predetermined number of samples.

37. A method for device driver interfacing comprising the steps of:

synchronizing a graphical user interface (GUI) to output data signals, wherein said output data signals are operable for outputting as a sequence of second, predetermined, data block sizes, said synchronizing step comprising the steps of:

incrementing a first counter in response to sending a first set of output data signals to said device driver, wherein said first counter points to a first entry in a buffer, each entry containing a data value corresponding to a data signal set number, and wherein said first entry contains a data set number corresponding to said first set; and incrementing a second counter in response to said device driver outputting a device output signal corresponding to a second set of data signals, said second counter pointing to a second entry, said second entry containing a data signal set number corresponding said second set.

38. The method of claim 37 wherein said synchronizing step further comprises the step of modifying said graphical user interface (GUI) when a value of said first counter and said second counter are unequal.

39. The method of claim 38 wherein said step of modifying said graphical display comprises the steps of:

erasing said graphical display at a current position on a display device, said current position corresponding to a last data signal set displayed;

drawing said graphical display at a succeeding position on said display device, said succeeding position corresponding to a next data signal set; and repeating said erasing and drawing steps until said succeeding position corresponds to said second data signal set.

40. A data processing system comprising:

circuitry operable for probing a device driver to determine a first data block size supported by a device driver interrupt rate wherein a set of input data signals from said device driver has said first data block size, said circuitry comprising:

circuitry operable for accessing a buffer having a plurality of entries, each entry being operable for storing a number of data samples and wherein said number of samples corresponds to a, selectable, size of each entry;

circuitry operable for receiving a first plurality of data samples from said device driver, wherein said first plurality of data samples completely fills one or more of said plurality of entries;

circuitry operable for incrementing a first counter by a value corresponding to a number of said one or more of said plurality of entries filled in said receiving step; and circuitry operable for incrementing a second counter by one in response to said accessing of said buffer.

41. The data processing system of claim 40 wherein said circuitry operable for probing further comprises:

circuitry operable for increasing said entry size by a predetermined number of samples when a value of said first counter and a value of said second counter are unequal;

circuitry operable for repeating said steps of accessing, receiving, and incrementing said first and second counters, wherein said repeating step is performed for a preselected number of accesses; and circuitry operable for outputting a current value of said entry size when respective values of said first and second counters are equal after each access, said first data block size corresponding to said current value of said entry size.

42. The data processing system of claim 41 wherein said circuitry operable for probing further comprises circuitry operable for incrementing a third counter when said value of said first counter and said value of said second counter are unequal, and wherein said entry size, after incrementing, corresponds to a value of said third counter, when said entry size is measured in said predetermined number of samples.

43. A data processing system comprising:

circuitry operable for synchronizing a graphical user interface (GUI) to output data signals, wherein said output data signals are operable for outputting as a sequence of second, predetermined, data block sizes, said synchronizing circuitry comprising:

circuitry operable for incrementing a first counter in response to sending a first set of output data signals to said device driver, wherein said first counter points to a first entry in a buffer, each entry containing a data value corresponding to a data signal set number, and wherein said first entry contains a data set number corresponding to said first set; and circuitry operable for incrementing a second counter in response to said device driver outputting a device output signal corresponding to a second set of data signals, said second counter pointing to a second entry, said second entry containing a data signal set number corresponding said second set.

44. The data processing system of claim 43 wherein said synchronizing circuitry further comprises circuitry operable for modifying said graphical user interface (GUI) when a value of said first counter and said second counter are unequal.

45. The data processing system of 44 wherein said circuitry operable for modifying said graphical display comprises:

circuitry operable for erasing said graphical display at a current position on a display device, said current position corresponding to a last data signal set displayed;

circuitry operable for drawing said graphical display at a succeeding position on said display device, said succeeding position corresponding to a next data signal set; and circuitry operable for repeating said erasing and drawing until said succeeding position corresponds to said second data signal set.

46. A computer program product operable for storage on program storage media, said program product including programming for device driver interfacing, the programming comprising:

programming for probing a device driver to determine a first data block size supported by a device driver interrupt rate wherein a set of input data signals from said device driver has said first data block size, said probing programming comprising:

programming for accessing a buffer having a plurality of entries, each entry being operable for storing a number of data samples and wherein said number of samples corresponds to a, selectable, size of each entry;

programming for receiving a first plurality of data samples from said device driver, wherein said first plurality of data samples completely fills one or more of said plurality of entries;

programming for incrementing a first counter by a value corresponding to a number of said one or more of said plurality of entries filled in said receiving step; and programming for incrementing a second counter by one in response to said accessing of said buffer.

47. The program product of claim 46 wherein said programming for probing further comprises:

programming for increasing said entry size by a predetermined number of samples when a value of said first counter and a value of said second counter are unequal;

programming for repeating said steps of accessing, receiving, and incrementing said first and second counters, wherein said repeating step is performed for a preselected number of accesses; and programming for outputting a current value of said entry size when respective values of said first and second counters are equal after each access, said first data block size corresponding to said current value of said entry size.

48. The program product of claim 47 wherein said programming for probing further comprises programming for incrementing a third counter when said value of said first counter and said value of said second counter are unequal, and wherein said entry size, after incrementing, corresponds to a value of said third counter, when said entry size is measured in said predetermined number of samples.

49. A computer program product operable for storage on program storage media, said program product including programming for device driver interfacing, the programming comprising:

programming for synchronizing a graphical user interface (GUI) to output data signals, wherein said output data signals are operable for outputting as a sequence of second, predetermined, data block sizes, said synchronizing programming comprising:

programming for incrementing a first counter in response to sending a first set of output data signals to said device driver, wherein said first counter points to a first entry in a buffer, each entry containing a data value corresponding to a data signal set number, and wherein said first entry contains a data set number corresponding to said first set; and programming for incrementing a second counter in response to said device driver outputting a device output signal corresponding to a second set of data signals, said second counter pointing to a second entry, said second entry containing a data signal set number corresponding said second set.

50. The program product of claim 49 wherein said synchronizing programming further comprises programming for modifying said graphical user interface (GUI) when a value of said first counter and said second counter are unequal.

51. The program product of 50 wherein said programming for modifying said graphical display comprises:

programming for erasing said graphical display at a current position on a display device, said current position corresponding to a last data signal set displayed;

programming for drawing said graphical display at a succeeding position on said display device, said succeeding position corresponding to a next data signal set; and programming for repeating said erasing and drawing until said succeeding position corresponds to said second data signal set.

* * * * *